United States Patent [19]

Ray

[11] 3,988,259

[45] Oct. 26, 1976

[54] CATALYST REGENERATION

[75] Inventor: Gardner C. Ray, Bartlesville, Okla.

[73] Assignee: Phillips Petroleum Company, Bartlesville, Okla.

[22] Filed: Mar. 20, 1975

[21] Appl. No.: 569,410

[52] U.S. Cl. .............................. 252/416; 210/63 R; 252/411 R; 252/412
[51] Int. Cl.$^2$ ..................... B01J 21/20; B01J 23/92; C02B 1/34
[58] Field of Search ........... 252/411, 416, 462, 463; 210/63

[56] References Cited
UNITED STATES PATENTS

| | | | |
|---|---|---|---|
| 3,168,587 | 2/1965 | Michaels et al. ................. | 260/683.3 |
| 3,207,808 | 9/1965 | Bajars et al. ....................... | 252/462 |
| 3,542,897 | 11/1970 | Wattimena et al. ............... | 252/462 |
| 3,645,913 | 2/1972 | Habermann ....................... | 252/411 R |
| 3,823,088 | 7/1974 | Box Jr. et al. ..................... | 210/63 |
| 3,897,511 | 7/1975 | Frevel et al. ...................... | 252/463 |

*Primary Examiner*—Winston A. Douglas
*Assistant Examiner*—P. E. Konopka

[57] ABSTRACT

A catalyst consisting essentially of a support which does not lose its integrity when contacted with vapor, water and oxygen under elevated temperature conditions, promoted with 0.05–20 weight percent of (1) at least two different metals active for initiating oxidative reactions selected from the group consisting of the metals of Groups IIIB, IVB, VB, VIB, VIIB, VIII, IB and VA of the Periodic Table; and (2) a rare earth metal after having been used to purify contaminated water in the presence of molecular oxygen is effectively regenerated by contacting said catalyst with hydrogen under elevated temperature conditions.

13 Claims, No Drawings

CATALYST REGENERATION

This invention relates to the purification of water containing oxidizable contaminants. More specifically, this invention relates to the regeneration of a catalyst which can be used for the purification of polluted water.

BACKGROUND OF THE INVENTION

Polluted water containing oxidizable contaminants, particularly organic contaminants such as naphthenes, aromatics and oxygenated compounds such as acids, aldehydes, ketones, ethers and the like, can be effectively purified by contacting the polluted water with oxygen and a catalyst consisting essentially of a support, e.g., zinc aluminate promoted with 0.05–20 weight percent of (1) at least two different metals active for initiating oxidative reactions selected from the group consisting of the metals of Groups IIIB, IVB, VB, VIB, VIIB, VIII, IB and VA of the Periodic Table; and (2) a rare earth metal at a temperature in the range of about 350° to 550° F and employing a molar ratio of water to oxygen in the range of 10:1 to 200:1. The organic contaminants are oxidized in this process mostly to carbon oxides and water.

The catalyst mentioned above is known in the art and its preparation and examples for the purification process are described in U.S. Pat. 3,823,088, issued to E. O. Box, Jr., and F. Farha on July 9, 1974.

Although the catalyst described in this patent has quite an extended period of use, the catalyst loses activity during its use in water purification. Therefore, the catalyst has to be replaced and/or regenerated.

THE INVENTION

It is, therefore, one object of this invention to provide a process for the regeneration of a catalyst.

A further object of this invention is to provide a process for the regeneration of oxidation catalysts consisting essentially of a support which does not lose its integrity when contacted with vapor, water and oxygen under elevated temperature conditions, promoted with 0.05–20 weight percent of (1) at least two different metals active for initiating oxidative reactions selected from the group consisting of the metals of Groups IIIB, IVB, VB, VIB, VIIB, VIII, IB and VA of the Periodic Table; and (2) a rare earth metal.

A still further object of this invention is to provide a process for restoring the activity of the catalyst described above when regular calcination has become ineffective. Calcination throughout this application means a heat treatment of the catalyst while contacting said catalyst with a free oxygen-containing gas, particularly air, oxygen or oxygen-enriched air.

These and other objects, advantages, embodiments, and aspects of the invention will become apparent to those skilled in the art from the following detailed description of the invention and the appended claims.

In accordance with this invention, I have now found that a catalyst consisting essentially of a support which does not lose its integrity when contacted with vapor, water and oxygen under elevated temperature conditions, promoted with 0.05–20 weight percent of (1) at least two different metals active for initiating oxidative reactions selected from the group consisting of the metals of Groups IIIB, IVB, VB, VIB, VIIB, VIII, IB and VA of the Periodic Table; and (2) a rare earth metal having been used to purify contaminated water in the presence of molecular oxygen, can be effectively regenerated by contacting said catalyst under elevated temperature conditions with hydrogen.

It has been found that this process in an effective way of regenerating the catalyst. Furthermore, it has been found that this regeneration was effective even in cases where calcination did not sufficiently restore the activity of said catalyst.

The catalyst which can be regenerated in accordance with this invention consists essentially of metals deposited on a support. The material of this support preferably is one selected from the group consisting of aluminates of metals of Group II of the Periodic Table and oxides of metals of Group IVB of the Periodic Table. Examples of such support materials are zinc aluminate, calcium aluminate, magnesium aluminate, barium aluminate, zirconia and titania. The presently preferred support materials are zinc aluminate and zirconia. Whereas the active promoter elements defined above are useful, it is presently preferred that (1) at least one of the two different metals is selected from the group consisting of copper, nickel, manganese, bismuth, platinum, palladium, iridium and rhenium; and that (2) said rare earth metal is selected from the group consisting of cerium and lanthanum. The presently preferred catalyst consists of zinc-aluminate promoted with copper, manganese and lanthanum.

In accordance with one presently preferred embodiment of this invention, the free oxygen is removed from the catalyst before contacting the catalyst with hydrogen. This is conveniently done by purging the catalyst with a nonreactive gas. As used in this application, the term nonreactive gas is defined to include any gas which will not react with other elements or compounds under conditions existing during its use. This method has proven to be an effective way of removing the oxygen present, e.g., by adsorption in the catalyst mass, in order to avoid the formation of an explosive oxygen/hydrogen mixture during the second step of contacting the catalyst with the hydrogen.

For this purging step all nonreactive gases can be used that will not react with oxygen or hydrogen under existing conditions. Examples of commonly available nonreactive gases useful for this step include nitrogen, carbon dioxide and steam. Nitrogen is presently preferred.

In accordance with a further embodiment of this invention, the hydrogen is removed from the catalyst after the hydrogen treatment step.

For removing the hydrogen from said catalyst it is presently preferred to pass a nonreactive gas through the treated catalyst. This constitutes a fast and simple step to avoid the formation of an explosive mixture, e.g., during a use of the catalyst following this regeneration process. The nonreactive gas, generally speaking, can be any gas which will not react with the catalyst, hydrogen or oxygen. Examples of commonly available nonreactive gases useful for this step of removing hydrogen from the treated catalyst include nitrogen, carbon dioxide and steam. Nitrogen is presently preferred.

In accordance with a further embodiment of this invention, the activity of the catalyst is determined by measuring the TOD (total oxygen demand) of the treated water and the regeneration is carried out whenever the activity of the catalyst has decreased under a predetermined value, e.g., when the TOD of the treated water is above 200 mg/liter, preferably when it is above 100 mg/liter. This embodiment makes possible an automatization of the purification process.

In a still further embodiment of this invention, the catalyst is periodically regenerated by calcination, the activity of the catalyst after this calcination is determined each time, and whenever said activity has decreased under a predetermined value, free oxygen is removed from said catalyst and said catalyst is then contacted with hydrogen under elevated temperature conditions in order to regenerate the catalyst. It has been found that even though the calcination has become ineffective, the hydrogen treatment still sufficiently reactivates the catalyst so that it can be placed back in service.

Furthermore, in accordance with another embodiment of this invention, the activity of the catalyst is determined after each hydrogen treatment and when this activity has fallen below the predetermined value the catalyst is reimpregnated with promoter meal salts and is thereafter calcined in air.

The regeneration conditions can be varied in relatively broad ranges. Usually the conditions lie within the ranges shown in the following Table I.

Table I

| Step | Temperature | Pressure (psig) |
| --- | --- | --- |
| Removal of oxygen | 300–1200° F (149–649° C) | 0–2000 |
| Treatment with hydrogen | 350–1200° F (177–649° C) | 0–2000 |

The invention will be more fully understood from the following examples containing preferred embodiments of this invention. These examples are intended to illustrate the invention, not to limit the scope of protection.

EXAMPLE I

Preparation of Catalyst

A sample of zinc aluminate prepared in accordance with Example I of U.S. Pat. No. 3,823,088 was calcined for 3 hours in air at 1875° F (1024° C), cooled and screened to obtain 40 g. of particles having a size of 14 to 20 U.S. mesh. These particles were impregnated with an aqueous solution containing the following components:

| | | |
| --- | --- | --- |
| Copper nitrate, | $Cu(NO_3)_2 \cdot 6H_2O$ | 6.74 g. |
| Manganese nitrate, | $Mn(NO_3)_2 \cdot 6H_2O$ | 4.40 g. |
| Lanthanum nitrate, | $La(NO_3)_3 \cdot 6H_2O$ | 1.35 g. | to obtain a pasty mass. The impregnated catalyst particles were thereafter dried at about 250° F (121° C) and calcined in air at 1600° F (871° C) for 5 hours prior to being used in the waste water oxidation process. The catalyst obtained then contained about 4 weight percent copper, about 2 weight percent manganese and about 1 weight percent lanthanum, each calculated as the metal.

Waste Water Treatment

The catalyst obtained in accordance with the above-described procedure was charged to one vertically arranged tubular fixed bed reactor. A mixture of waste water and air in a molar ratio shown in the following table was passed through said reactor. This mixture was preheated to about 490° F (254° C). The waste water treated with this catalyst was reboiler blowdown water from the catalytic oxidative dehydrogenation process to produce butadiene from butenes. The waste water contained various amounts of dissolved and suspended by-products such as paraffins, olefins, naphthenes, aromatics and oxygen-containing organic compounds such as acids, alcohols, aldehydes, ethers, ketones and the like. The total oxygen demand (TOD) of the water averaged about 2000 to 2200 mg/liter. This represents the equivalent of about 900 ppm carbon. The total oxygen demand defines the quantity of oxygen necessary to completely oxidize all organic compounds to carbon dioxide and water. This total oxygen demand is determined by means of a Model 225 TOD analyzer manufactured by Ionics, Inc., Bridgeville, Pennsylvania.

The polluted water, together with the oxygen, was passed through the reactor continuously and in downward direction while maintaining liquid phase conditions. The pressure necessary to maintain the liquid phase conditions was about 685 to about 695 psig. Several regenerations by calcination were made. Thus, for instance, after 1555 hours of use of the catalyst and two regenerations (conducted in air), the stream of feed water was shut off. The water after treatment had a TOD of 116 ppm (see Table II, run 1) and the reactor temperature increased from its normal 490° F (254° C) to about 520° F (271° C). The system was then purged with dry nitrogen. Then, dry hydrogen was passed over the catalyst for 4 hours at a rate of about 400 volumes of hydrogen per volume of catalyst per hour at about atmospheric pressure. Thereafter, the hydrogen flow was shut off and the reactor was purged with dry nitrogen. Then the polluted water and the air were again passed over the regenerated catalyst at the original operating temperature. The relative catalyst activity can be determined from the TOD of the water leaving the catalyst. Since the function of the catalyst is to remove oxidizable compounds, the more active catalyst will reduce the TOD of the treated water to a lower value. The TOD was 116 mg/liter before the hydrogen regeneration and after 19 hours of use of the catalyst after the hydrogen regeneration, the TOD was 69 mg/liter. Thus, the regeneration increased the catalyst activity.

After 2117 hours of the use, the catalyst was regenerated with air. The activity of the catalyst as determined by the TOD of the purified water was 162 mg/liter (Table II, col. 3). The feed water was shut off and the temperature of the reactor increased to about 530° F (277° C). Dry air at the rate of about 230 volumes of air per volume of catalyst per hour was passed over the catalyst for 21 hours at about atmospheric pressure. Thereafter the reactor temperature was lowered to operating temperature and the feed water and air were again passed over the catalyst to purify the feed water. The TOD of the water leaving the catalyst before this calcination step was 162 mg/liter. After 73 hours of use after the calcination regeneration, the TOD of the purified water was 144 mg/liter. This demonstrates that the catalyst was slightly more active after air regeneration but that effective regeneration was not accomplished.

Correspondingly, after 2515 hours of use, the catalyst was regenerated by the hydrogen treatment described above and the same hydrogen regeneration was carried out after 2951 hours of use. All the results of these regeneration steps, including the product qualities before the regeneration and after a certain number of hours of use after the regeneration, are shown in the following Table II.

Table II

Liquid-phase Catalyst Air-oxidation of Aqueous Wastes over Metal-promoted Zinc Aluminate Catalyst and Regeneration of the Catalyst

| Run No. | 1 | 2 | 3 | 4 | 5 | 6 | 7 | 8 |
|---|---|---|---|---|---|---|---|---|
| Temperature, °F | 493 | 492 | 490 | 492 | 492 | 492 | 492 | 488 |
| Pressure, psig | 685 | 690 | 685 | 685 | 695 | 695 | 690 | 690 |
| Water/Air, mole ratio | 33.8 | 28.5 | 36.4 | 30.6 | 31.3 | 29.5 | 25.9 | 29.2 |
| Water Feed Rate, LHSV | 3.17 | 3.17 | 3.43 | 3.28 | 3.24 | 3.23 | 3.12 | 3.23 |
| Total Catalyst Age, hrs. | 1,555 | 1,574 | 2,117 | 2,190 | 2,515 | 2,582 | 2,951 | 2,996 |
| On Stream after Regeneration, hrs. | — | 19 | — | 73 | — | 67 | — | 45 |
| Regeneration medium | | hydrogen | | air | | hydrogen | | hydrogen |
| Product Quality, TOD mg/liter[1] | 116 | 69 | 162 | 144 | 105 | 56 | 186 | 107 |
| TOD Reduction[2], % | 94.5 | 96.7 | 92.3 | 93.1 | 95.0 | 97.3 | 91.1 | 94.9 |
| Percent Reduction TOD[3] | | 43% | | 9% | | 46.5% | | 42.5% |

[1]The analyses of TOD of the water after each regeneration were generally selected after a period of time during which stable running conditions were obtained and alsoreflect a significant running time for a performance evaluation of the catalyst.
[2]Based on an average TOD of 2100 mg/liter of feed water.
[3]Based on TOD of the water before the regeneration.

The results shown in this table demonstrate that the air regeneration after 2,117 hours of use is not effective anymore. The desired TOD of the purified water lies in the range of about 50 to about 200 mg/liter and preferably about 50 to 100 mg/liter. On the other hand, the hydrogen treatment clearly regenerates the catalyst resulting in a considerable reduction in the TOD of the water produced or, correspondingly, increases the catalyst activity. In comparing runs 7 and 8, the increase in catalyst activity is also considerable since the TOD of treated water decreased from 186 to 107 mg/liter. However, the high TOD value of 107 suggests that possibly a sufficient quantity of metal promoters have been leached from the catalyst during the process to render the hyrogen regeneration less effective. At this point the catalyst can be rejuvenated effectively by reimpregnation with a suitable quantity of the promoter metals followed by calcination in air.

Reasonable variations and modifications which will be apparent to those skilled in the art can be made in this invention without departing from the spirit and scope thereof.

What is claimed is:

1. A process for regenerating a catalyst which has becme inactive by contacting it with oxygen and polluted water containing oxidizable organic contaminants therein whereby contaminants are oxidized to carbon dioxide, and which catalyst consists essentially of a support which does not lose its integrity when contacted with vapor, water and oxygen under elevated temperature conditions selected from the group consisting of Group II metal aluminates and Group IVB metal oxides, promoted with 0.05–20 weight percent of (1) at least two different metals active for initiation of oxidative reactions selected from the group of metals of Groups IIIB, IVB, VB, VIB, VIIB, VIII, IB and Va of the Periodic Table and (2) a rare earth metal, said process comprising contacting said catalyst with hydrogen at an elevated temperature of about 350° F to about 1200° F.

2. A process in accordance with claim 1 comprising
   a. periodically regenerating said catalyst by calcination in a free oxygen-containing gas selected from the group consisting of oxygen, oxygen-enriched air and air,
   b. determining the activity of the catalyst after stable conditions after regeneration have been reached,
   c. removing free oxygen from said catalyst after said activity has decreased under a first predetermined value, and
   d. thereafter contacting said catalyst with hydrogen under elevated temperature conditions.

3. A process in accordance with claim 1 wherein said supports are selected from the group consisting of zinc aluminate, calcium aluminate, magnesium aluminate, strontium aluminate, barium aluminate, zirconia and titania.

4. A process in accordance with claim 1 wherein
   in a first step free oxygen is removed from said catalyst; and
   in a second step said catalyst is treated with molecular hydrogen at elevated temperatures.

5. A process in accordance with claim 1 wherein said oxygen is removed from said catalyst by passing a stream of nonreactive gas through said catalyst.

6. A process in accordance with claim 1 wherein free hydrogen present in said catalyst is removed from said catalyst after the hydrogen treatment.

7. A process in accordance with claim 6 wherein a stream of nonreactive gas is passed through said catalyst to remove free hydrogen therefrom.

8. A process in accordance with claim 5 wherein said nonreactive gas stream is a nitrogen gas stream.

9. A process in accordance with claim 6 wherein said nonreactive gas stream is a nitrogen gas stream.

10. A process in accordance with claim 1 wherein a catalyst is used containing about 4 weight percent copper, about 2 weight percent manganese and about 1 weight percent lanthanum on zinc aluminate calculated as the metal on the zinc aluminate.

11. A process in accordance with claim 1 wherein the activity of the catalyst is determined after each hydrogen regeneration and wherein said catalyst is reimpregnated with promoter metal salts and is calcined in air when said activity has fallen below a second predetermined value.

12. A process in accordance with claim 1 wherein said catalyst is contacted with hydrogen at a temperature in the range of about 350° to about 1200° F and at a pressure of 0 to about 2000 psig.

13. A process in accordance with claim 1 wherein the free oxygen is removed from the catalyst at a temperature of about 300° to about 1200° F and at a pressure of 0 to about 2000 psig.

* * * * *

UNITED STATES PATENT AND TRADEMARK OFFICE
CERTIFICATE OF CORRECTION

PATENT NO. : 3,988,259
DATED : October 26, 1976
INVENTOR(S) : Gardner C. Ray

It is certified that error appears in the above-identified patent and that said Letters Patent are hereby corrected as shown below:

On the Title Page Item [21] should read --- 560,410 ---.

Signed and Sealed this

Fourth Day of January 1977

[SEAL]

Attest:

RUTH C. MASON
*Attesting Officer*

C. MARSHALL DANN
*Commissioner of Patents and Trademarks*